(12) United States Patent
Mitsukawa et al.

(10) Patent No.: US 9,259,775 B2
(45) Date of Patent: Feb. 16, 2016

(54) CORRUGATED PLATE MANUFACTURING APPARATUS

(71) Applicant: DENSO CORPORATION, Kariya, Aichi-pref. (JP)

(72) Inventors: Kazuhiro Mitsukawa, Ichinomiya (JP); Masafumi Takahashi, Nishio (JP); Keisuke Nakamura, Okazaki (JP); Hidemasa Otsubo, Obu (JP); Nobuyuki Morikawa, Toyoake (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 353 days.

(21) Appl. No.: 13/741,462

(22) Filed: Jan. 15, 2013

(65) Prior Publication Data

US 2013/0180698 A1 Jul. 18, 2013

(30) Foreign Application Priority Data

Jan. 17, 2012 (JP) ................................. 2012-006998

(51) Int. Cl.
*B21D 53/02* (2006.01)
*B21D 13/00* (2006.01)
*B23P 15/26* (2006.01)
(Continued)

(52) U.S. Cl.
CPC .............. *B21D 53/022* (2013.01); *B21D 13/00* (2013.01); *B23P 15/26* (2013.01); *F28F 1/40* (2013.01); *B21D 13/04* (2013.01);
(Continued)

(58) Field of Classification Search
CPC ........ B21D 13/02; B21D 13/04; B21D 53/08; B21D 53/022; B21D 35/001; B21D 35/003; B21D 13/00; B21D 37/08; B21D 43/28; B21D 53/04; B23P 15/26
USPC ........... 72/379.6, 385, 404, 405.01, 129, 130, 72/131
See application file for complete search history.

(56) References Cited

U.S. PATENT DOCUMENTS 2,079,553 A * 5/1937 Fraser ............................ 72/396
2,510,024 A * 5/1950 Mayer ............................ 72/397
(Continued)

FOREIGN PATENT DOCUMENTS

JP  10-058240  3/1998
JP  10-197180  7/1998
(Continued)

OTHER PUBLICATIONS

U.S. Appl. No. 13/302,209, filed Nov. 22, 2011, Otsubo et al.
(Continued)

*Primary Examiner* — Edward Tolan
(74) *Attorney, Agent, or Firm* — Harness, Dickey & Pierce, P.L.C.

(57) ABSTRACT

Flat-plate connecting portions are formed in a band plate by a connecting-portion forming unit. The flat-plate connecting portions are cut off by another connecting-portion forming unit except one flat-plate connecting portion so as to form a corrugated-plate connecting portion. A corrugated-plate portion is formed by a corrugation forming unit, so that the corrugated-plate portion has multiple projections arranged in a width direction of the band plate and each of the projections extends in a plate feeding direction. The corrugated-plate connecting portion corresponding to a predetermined connecting number is cut off so as to form a corrugated fin having a predetermined number of corrugated-plate portions.

10 Claims, 8 Drawing Sheets

(51) Int. Cl.
*F28F 1/40* (2006.01)
*B21D 13/04* (2006.01)
*F28F 1/12* (2006.01)
*F28D 21/00* (2006.01)

(52) U.S. Cl.
CPC ........ *F28D 2021/0089* (2013.01); *F28F 1/128* (2013.01); *F28F 2215/08* (2013.01); *Y10T 29/5142* (2015.01)

(56) References Cited

U.S. PATENT DOCUMENTS

| | | | |
|---|---|---|---|
| 3,351,441 A * | 11/1967 | Gewiss | 428/594 |
| 3,828,705 A * | 8/1974 | Morrison | 72/332 |
| 4,027,521 A * | 6/1977 | McKee et al. | 72/404 |
| 4,250,728 A * | 2/1981 | King | 72/177 |
| 5,791,186 A * | 8/1998 | Nishida et al. | 72/337 |
| 6,138,354 A | 10/2000 | Kobayashi et al. | |
| 6,192,731 B1 * | 2/2001 | Toivanen | 72/307 |
| 2007/0163768 A1 | 7/2007 | Shinhama | |
| 2012/0222293 A1* | 9/2012 | Ueda et al. | 29/727 |

FOREIGN PATENT DOCUMENTS

| | | |
|---|---|---|
| JP | 2002-107082 | 4/2002 |
| JP | 2002-224752 | 8/2002 |
| JP | 2007-178010 | 7/2007 |
| JP | 2008-087033 | 4/2008 |
| JP | 2010-264495 | 11/2010 |

OTHER PUBLICATIONS

Office Action dated Jul. 25, 2014 in the corresponding CN application No. 201310017699.8 with English translation.

* cited by examiner

CORRUGATED PLATE MANUFACTURING APPARATUS

CROSS REFERENCE TO RELATED APPLICATION

This application is based on Japanese Patent Application No. 2012-006998 filed on Jan. 17, 2012, the disclosure of which is incorporated herein by reference.

FIELD OF TECHNOLOGY

The present disclosure relates to a corrugated plate manufacturing apparatus, a method for manufacturing the corrugated plate and a heat exchanger using the corrugated plate.

BACKGROUND

It is known in the art that a band plate, which is un-rolled from a coil, is bent so as to form a corrugated plate. According to such known art, multiple punches arranged in a plate feeding direction of the band plate are sequentially pushed down to the band plate to form the corrugated plate. The corrugated plate has multiple projections arranged in the plate feeding direction, wherein each of the projections extends in a width direction of the band plate. The corrugated plate thus manufactured is used as a heat absorbing element or a heat radiating element of a heat exchanger. It is necessary to change a length of the corrugated plate, that is, a length of the projection in a longitudinal direction of the projection, depending on each type of the heat exchanger, to which the corrugated plate is applied.

According to the above conventional method for manufacturing the corrugated plate, the length of the projection in its longitudinal direction is decided by a width of the band plate. Therefore, it is necessary to stop a production line to exchange the coil for the band plate, in order to change the width of the band plate, that is, the length of the projection in its longitudinal direction. It is a problem that production efficiency is decreased.

According to another prior art, for example, as disclosed in Japanese Patent Publication No. H10-197180, a press portion has multiple bending punches arranged in a width direction of a band plate and multiple press portions are provided in a plate feeding direction of the band plate. A flat-plate portion of the band plate is bent step by step in the plate feeding direction by multi-stage bending processes, so that a corrugated plate is formed, wherein the corrugated plate has multiple projections arranged in the width direction and each of the projections extends in the plate feeding direction. According to the above manufacturing method, when a cutting portion of the band plate in the plate feeding direction is changed, it is possible to manufacture different kinds of the corrugated plates having different lengths of the projections in the longitudinal direction of the projection without changing the coil for the band plate.

It is, however, a problem that a length of a manufacturing line becomes longer because the multiple press portions are provided in the plate feeding direction.

SUMMARY OF THE DISCLOSURE

The present disclosure is made in view of the above problem. It is an object of the present disclosure to provide a manufacturing apparatus and a manufacturing method for a corrugated plate, according to which production efficiency can be increased and a length of the manufacturing line can be made smaller. It is another object of the present disclosure to provide a heat exchanger using the corrugated plate manufactured by the above manufacturing apparatus and method.

According to a feature of the present disclosure, a manufacturing apparatus for a corrugated plate has;
    a plate feeding unit;
    a first connecting-portion forming unit;
    a corrugation foaming unit;
    a control unit; and
    a cutoff unit.

The plate feeding unit un-rolls a band plate from a coil and feeds an un-rolled band plate in a longitudinal direction of the band plate.

The first connecting-portion forming unit forms a plate connecting portion at one position of the band plate in a width direction of the band plate, wherein multiple plate connecting portions are formed in the band plate at predetermined intervals in a plate feeding direction of the band plate, so that multiple flat-plate portions are formed and respectively connected to each other by each of the plate connecting portions.

The corrugation forming unit bends each of the flat-plate portions between neighboring plate connecting portions to form a corrugated-plate portion, wherein the corrugated-plate portion has multiple projections arranged in the width direction of the band plate and each of the projections extends in the plate feeding direction.

The control unit presets a connecting number for the corrugated-plate portions to be included in a corrugated fin.

The cutoff unit cuts off the plate connecting portion corresponding to a predetermined connecting number preset by the control unit, so as to form the corrugated fin.

The above manufacturing apparatus manufactures the corrugated fin, which is composed of one corrugated-plate portion or which is composed of the multiple corrugated-plate portions and one or multiple plate connecting portions.

It is, therefore, not necessary to stop a manufacturing line for the purpose of exchanging the coil for the band plate. It is possible to manufacture the multiple different kinds of the corrugated fins by simply changing the connecting number for the corrugated-plate portions, wherein each different kind of the corrugated fin has a different length in a longitudinal direction (an extending direction) of the projections. Accordingly, production efficiency is increased.

In each of the flat-plate portions, which are connected to each other by the flat-plate connecting portion in the plate feeding direction, the movement of the flat-plate portion in the width direction is not restricted except for the one portion in the width direction (that is, the portion corresponding to the flat-plate connecting portion (19)). It is, therefore, possible to shape the flat-plate portion into the corrugated-plate portion by one operation of the corrugation forming unit. In other words, it is sufficient to provide one corrugation forming unit for shaping the flat-plate portion to the corrugated-plate portion in the plate feeding direction. A length of the manufacturing line can be thus made smaller.

According to another feature of the present disclosure, a method for manufacturing a corrugated plate has;
    a step for feeding a band plate;
    a step for forming a plate connecting portion;
    a step for bending a flat-plate portions; and
    a step for cutting off the plate connecting portion.

In the step for feeding the band plate, the band plate is un-rolled from a coil and such un-rolled band plate is fed in a longitudinal direction of the band plate.

In the step for forming the plate connecting portion, the plate connecting portion is formed at one position of the band plate in a width direction of the band plate, wherein multiple plate connecting portions are formed in the band plate at predetermined intervals in a plate feeding direction of the band plate, so that multiple flat-plate portions are formed and respectively connected to each other by each one of the plate connecting portions.

In the step for bending the flat-plate portions, each of the flat-plate portions between the neighboring plate connecting portions is bent to form a corrugated-plate portion, wherein the corrugated-plate portion has multiple projections arranged in the width direction of the band plate and each of the projections extends in the plate feeding direction.

In the step for cutting off the plate connecting portion, the plate connecting portion corresponding to a predetermined connecting number is cutoff.

According to the above manufacturing method, the corrugated fin, which is composed of one corrugated-plate portion or which is composed of the multiple corrugated-plate portions and one or multiple plate connecting portions, is manufactured.

It is, therefore, not necessary to stop a manufacturing line for the purpose of exchanging the coil for the band plate. It is possible to manufacture the multiple different kinds of the corrugated fins by simply changing the connecting number for the corrugated-plate portions, wherein each different kind of the corrugated fin has a different length in a longitudinal direction (an extending direction) of the projections. Accordingly, production efficiency is increased.

In addition, in each of the flat-plate portions, which are connected to each other by the flat-plate connecting portion in the plate feeding direction, the movement of the flat-plate portion in the width direction is not restricted except for the one portion in the width direction (that is, the portion corresponding to the flat-plate connecting portion (19)). It is, therefore, possible to shape the flat-plate portion into the corrugated-plate portion by one operation of the bending step. In other words, it is sufficient to carryout the bending step at one station for shaping the flat-plate portion to the corrugated-plate portion in the plate feeding direction. A length of the manufacturing line can be thus made smaller.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

The present disclosure will be explained hereinafter byway of multiple embodiments. The same reference numerals are given to the same or similar portions and/or structures throughout the embodiments, for the purpose of eliminating repeated explanation.

(First Embodiment)

Figure 1:
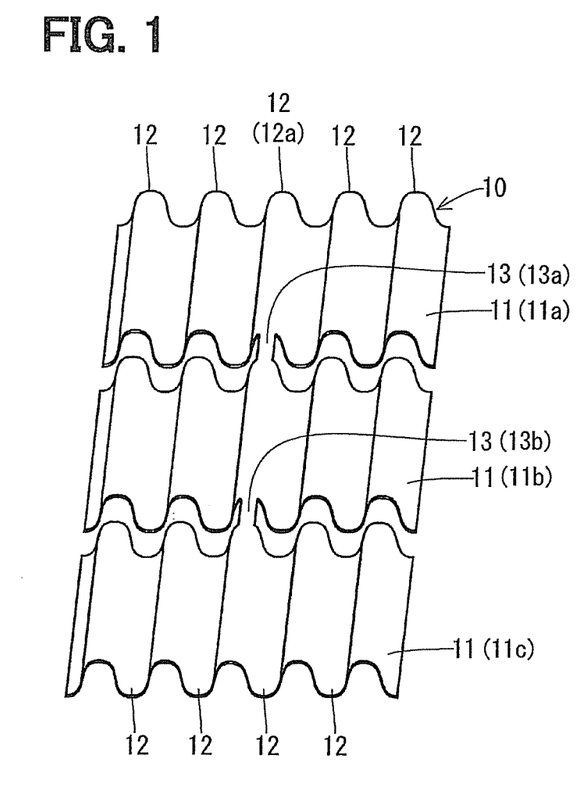
FIG. 1 is a schematic perspective view showing an inner fin, which is manufactured by a corrugated-plate manufacturing apparatus according to a first embodiment of the present disclosure.

FIG. 1 shows an example of an inner fin 10, which is manufactured by a corrugated-plate manufacturing apparatus 30 (FIG. 5) according to a first embodiment of the present disclosure.

Figure 2:
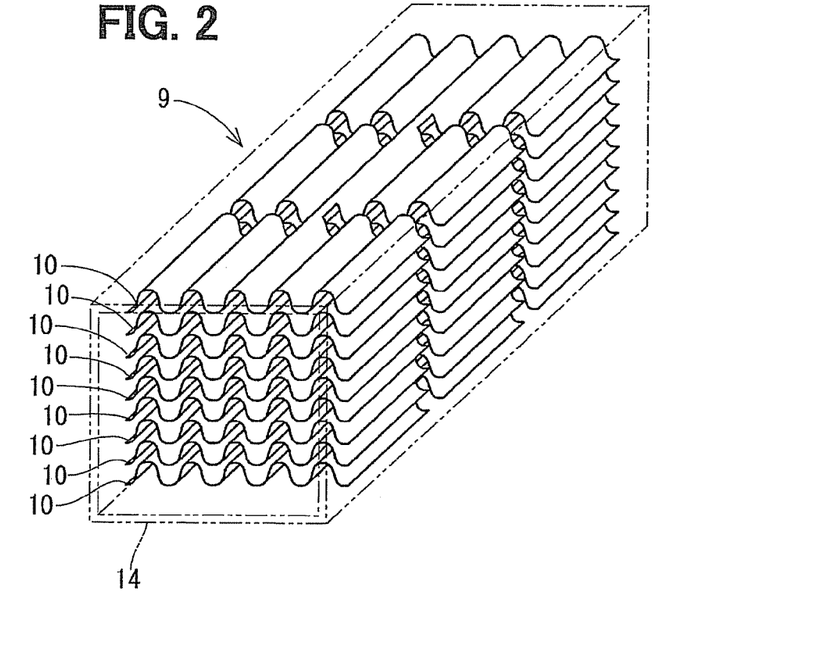
FIG. 2 is a schematic perspective view showing a tube of an oil-cooler, in which the inner fin of FIG. 1 is accommodated.

The inner fin 10 is formed in a corrugated shape and arranged in an inside of a tube 14, as shown in FIG. 2. The tube 14 forms a fluid passage of an oil-cooler 9 for cooling down oil for an engine mounted in a vehicle. The oil-cooler 9 is a heat exchanger and the inner fin 10 is a heat absorbing element for absorbing heat from the oil flowing through the oil-cooler 9. The inner fin 10 is, therefore, a heat absorbing fin. In FIG. 2, the tube 14 is indicated by a two-dot-chain line.

As shown in FIG. 1, the inner fin 10 is composed of three corrugated-plate portions 11 (11a-11c) and two corrugated-plate connecting portions 13 (13a-13b). Each of the corrugated-plate portions 11 has multiple projecting portions 12 extending in a longitudinal direction of the tube 14 (FIG. 2) and arranged in a width direction of the tube 14. Each one of the neighboring projections 12 is projecting in a direction, which is perpendicular to the longitudinal direction and the width direction of the tube 14 (hereinafter, a vertical direction), while each other one of the neighboring projections 12 is projecting in the vertical direction but in an opposite direction. Hereinafter, the projections 12, which are projecting in an upward direction, are called as upper-side projections, while the projections 12, which are projecting in a downward direction, are called as lower-side projections. Each of the corrugated-plate connecting portions 13 is formed between the neighboring the corrugated-plate portions 11. More exactly, the first corrugated-plate connecting portion 13a connects the upper-side projection 12 (12a) of the first corrugated-plate portion 11a and the upper-side projection 12 of the second corrugated-plate portion 11b, while the second corrugated-plate connecting portion 13b connects the upper-side projection 12 of the second corrugated-plate portion 11b and the upper-side projection 12 of the third corrugated-plate portion 11c. Each of the corrugated-plate connecting portions 13a and 13b is formed at the upper-side projections 12 (12a), which are located at a center of the respective corrugated-plate portions 11a-11c in the width direction.

Figure 3:
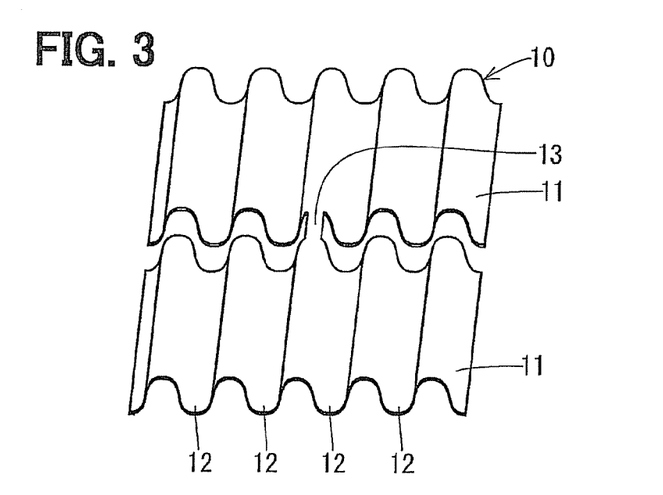
FIG. 3 is a schematic perspective view showing an inner fin having two corrugated-plate portions.
Figure 4:
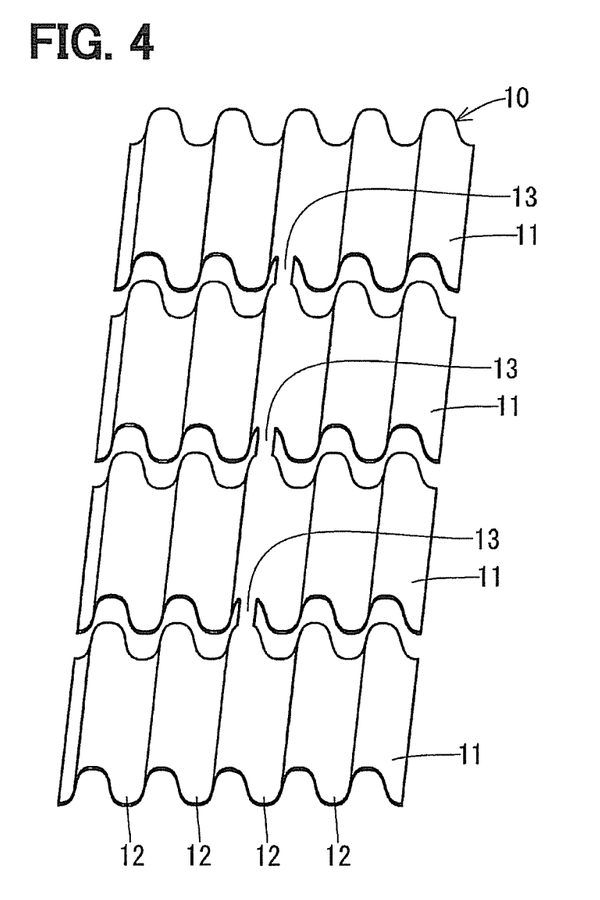
FIG. 4 is a schematic perspective view showing an inner fin having four corrugated-plate portions.

Modifications of the inner fin 10 are shown in FIGS. 3 and 4. In the modification shown in FIG. 3, the inner fin 10 is composed of two corrugated-plate portions 11 and one corrugated-plate connecting portion 13. In the modification shown in FIG. 4, the inner fin 10 is composed of four corrugated-plate portions 11 and three corrugated-plate connecting portions 13.

Figure 5:
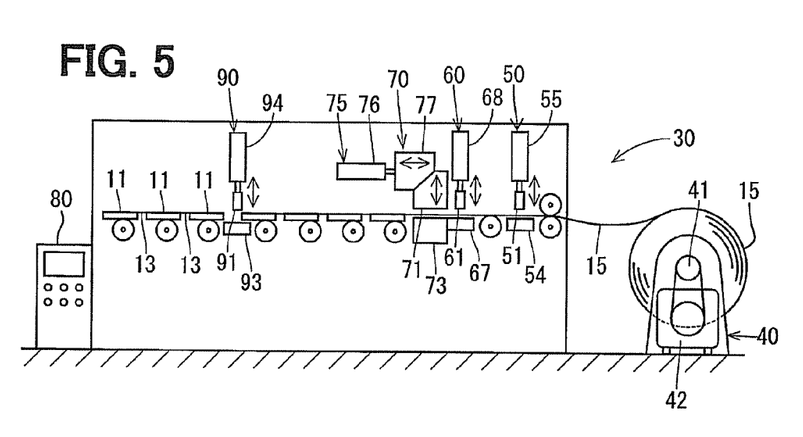
FIG. 5 is a schematic view showing the corrugated-plate manufacturing apparatus according to the first embodiment of the present disclosure.
Figure 6:
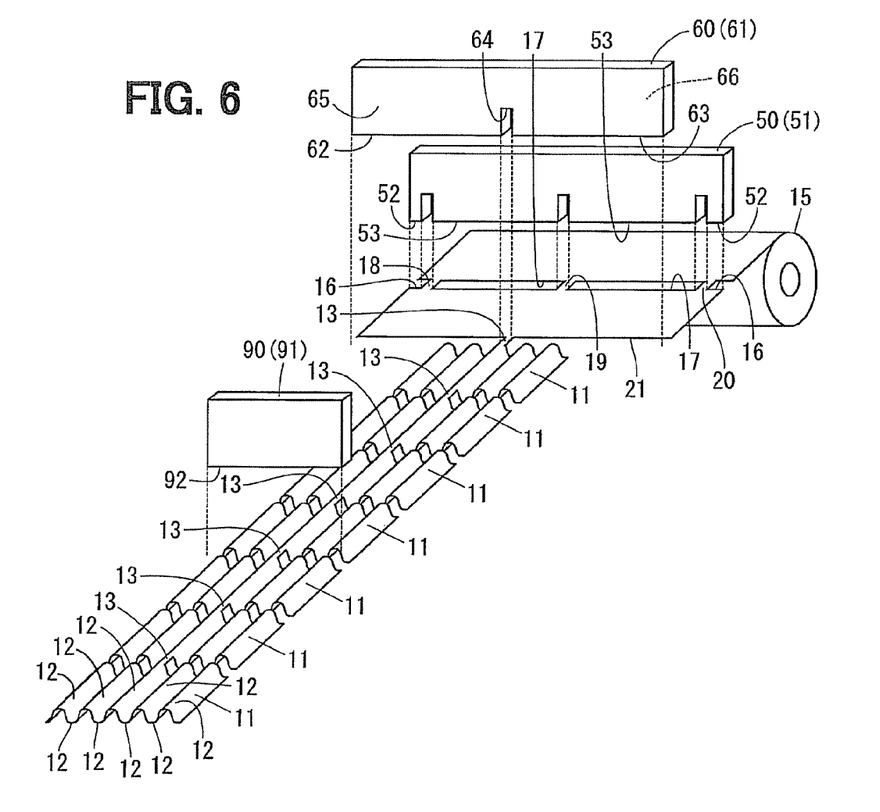
FIG. 6 is a schematic perspective view showing a band plate, which is processed by the corrugated-plate manufacturing apparatus of FIG. 5.
Figure 7:
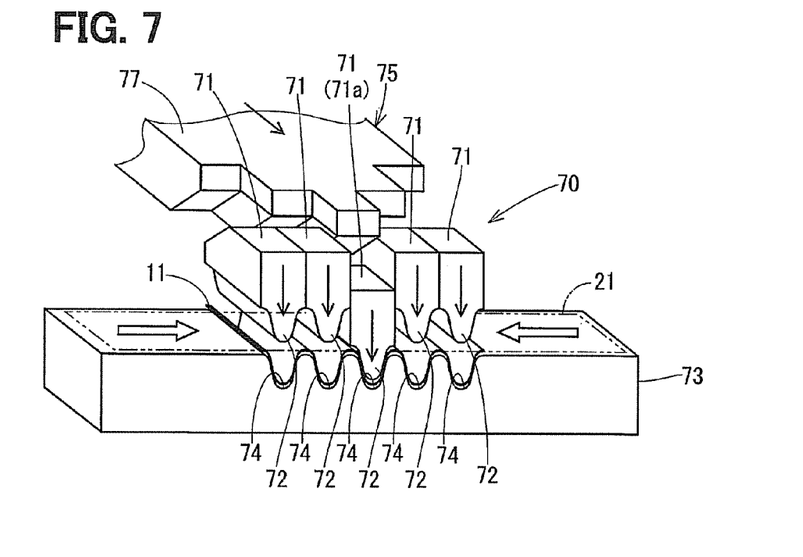
FIG. 7 is a schematic perspective view showing a corrugated-plate shaping unit of the corrugated-plate manufacturing apparatus of FIG. 5.

The corrugated-plate manufacturing apparatus 30 will be explained with reference to FIGS. 5 to 7. The corrugated-plate manufacturing apparatus 30 is composed of a first processing unit of a plate feeding device 40, a second processing unit 50 for forming flat-plate connecting portions 18, 19 and 20, a third processing unit 60 for forming the corrugated-plate connecting portion 13, a fourth processing unit 70 for forming the corrugated-plate portion 11, a control unit 80 and a fifth processing unit 90 (a cutoff unit 90).

The first processing unit (the plate feeding device 40) is composed of a rotational shaft 41 and a rotation driving portion 42. The rotational shaft 41 supports a band plate 15 rolled in a coil shape. The band plate 15 of the coil shape is rotated together with the rotational shaft 41. The band plate 15 is made of metal. The rotation driving portion 42 is composed of, for example, an electric motor. The rotation driving portion 42 rotates the rotational shaft 41, so that the band plate 15 of the coil shape is un-rolled, and feeds the un-rolled band plate 15 in a longitudinal direction thereof (hereinafter, a plate feeding direction). The band plate 15 is intermittently moved in the plate feeding direction by a predetermined feeding amount.

The second processing unit 50 is located in front of (that is, at a downstream side of) the first processing unit 40 (the plate feeding device 40) in the plate feeding direction and is composed of a blanking punch 51, a blanking die 54 and a punch driving portion 55.

The blanking punch 51 is positioned at an upper side of the band plate 15 and movable in a vertical direction. As shown in FIG. 6, the blanking punch 51 has notch forming portions 52 and punching portions 53. The notch forming portions 52 form notches 16 at both side ends of the band plate 15 in a width direction thereof. The punching portions 53 form two slotted holes 17 between the notches 16. The notches 16 and slotted holes 17 are aligned in the width direction.

The blanking die 54 is positioned at a lower side of the band plate 15 and has multiple die holes (not shown), respectively corresponding to the notch forming portions 52 and the punching portions 53 of the blanking punch 51.

The punch driving portion 55 is composed of, for example, a hydraulic cylinder, an electrically-operated cylinder or the like. The punch driving portion 55 drives the blanking punch 51 in the vertical direction (in a direction perpendicular to the band plate 15), each time when the plate feeding device 40 feeds the band plate 15 by the predetermined feeding amount, so that three flat-plate connecting portions 18, 19 and 20 are formed in the band plate 15 in the width direction of the band plate 15. The three flat-plate connecting portions 18, 19 and 20 are formed in the band plate 15 at predetermined intervals in the plate feeding direction. The three flat-plate connecting portions 18, 19 and 20 are aligned in the width direction of the band plate 15. The flat-plate connecting portion 19 is formed at an intermediate position in the width direction (more exactly, at a center position), while the other two flat-plate connecting portions 18 and 20 are formed at positions close to the side ends of the band plate 15. The three flat-plate connecting portions 18, 19 and 20 connect flat-plate portions 21 with each other, which are neighboring to each other in the plate feeding direction. As a result, the flat-plate portions 21 are stably moved in the plate feeding direction and supplied from the second processing unit 50 to the third processing unit 60.

The third processing unit 60 for forming the corrugated-plate connecting portion 13 is located at a downstream side of the second processing unit 50 (for forming the flat-plate connecting portions 18, 19 and 20) in the plate feeding direction. The third processing unit 60 is composed of a cutoff punch 61, a cutoff die 67 and a punch driving portion 68. The punch driving portion 68 is also referred to as a second driving portion.

The cutoff punch 61 is positioned at the upper side of the band plate 15 and movable in the vertical direction. As shown in FIG. 6, the cutoff punch 61 has cutting blade portions 62 and 63 and a groove 64. The cutting blade portions 62 and 63 cut off the flat-plate connecting portions 18 and 20 of the band plate 15, except for the intermediate flat-plate connecting portion 19. The groove 64 is formed at an intermediate position in the width direction (more exactly, at a center position), wherein the intermediate position for the groove 64 corresponds to the position of the flat-plate connecting portion 19 of the band plate 15. The groove 64 has a dimension in the width direction, which is the same to the dimension of the flat-plate connecting portion 19 in the width direction.

The cutoff die 67 is positioned at the lower side of the band plate 15 and has multiple die holes (not shown), respectively corresponding to the cutting blade portions 62 and 63 of the cutoff punch 61.

The punch driving portion 68 is composed of, for example, a hydraulic cylinder, an electrically-operated cylinder or the like. The punch driving portion 68 drives the cutoff punch 61 in the vertical direction (in the direction perpendicular to the band plate 15), each time when the plate feeding device 40 feeds the band plate 15 by the predetermined feeding amount, so that the flat-plate connecting portions 18 and 20 are cut off. The flat-plate connecting portion 19 remains as the corrugated-plate connecting portion 13. The third processing unit 60 forms the corrugated-plate connecting portion 13 (corresponding to the flat-plate connecting portion 19) at the intermediate position of the band plate 15 in the width direction and at the predetermined interval in the plate feeding direction.

The flat-plate connecting portion 19 and the corrugated-plate connecting portion 13 are also collectively referred to as a plate connecting portion. The second processing unit 50 (for forming the flat-plate connecting portions) and the third processing unit 60 (for forming the corrugated-plate connecting portion) are also collectively referred to as a first connecting-portion forming unit.

The groove 64 of the cutoff punch 61 is fitted to the flat-plate connecting portion 19 when the cutoff punch 61 is moved in a downward direction. The groove 64 has a function for positioning the band plate 15 to the cutoff punch 61 in the width direction.

When the cutoff punch 61 is moved in the downward direction, a forward-side surface 65 of the cutoff punch 61 is brought into contact with a back-side end of the flat-plate portion 21, which is located at a downstream side of the cutoff punch 61 in the plate feeding direction. In a similar manner, when the cutoff punch 61 is moved in the downward direction, a backward-side surface 66 of the cutoff punch 61 is brought into contact with a front-side end of the flat-plate portion 21, which is located at an upstream side of the cutoff punch 61 in the plate feeding direction. The forward-side surface 65 and the backward-side surface 66 of the cutoff punch 61 function as a positioning unit for positioning the band plate 15 to the cutoff punch 61 in the plate feeding direction.

The third processing unit 60 for forming the corrugated-plate connecting portion 13 and the fourth processing unit 70 for shaping the flat-plate portion 21 to the corrugated-plate portion 11 are fixed to a common base body (not shown) of the apparatus 30. When the cutoff punch 61 is moved in the downward direction, the cutoff punch 61 is engaged with the band plate 15. More exactly, the flat-plate connecting portion 19 of the band plate 15 is inserted into the groove 64 of the cutoff punch 61. By means of this engagement between the cutoff punch 61 and the band plate 15, the cutoff punch 61 positions the band plate 15 to bending punches 71 of the fourth processing unit 70.

The fourth processing unit 70 for shaping the flat-plate portion 21 to the corrugated-plate portion 11 is located at a downstream side of the third processing unit 60 in the plate feeding direction. The fourth processing unit 70 has multiple bending punches 71, a bending die 73 and a punch driving portion 75. The punch driving portion 75 is also referred to as a first driving portion. In FIG. 7, the flat-plate portion 21 and the corrugated-plate portion 11, which are respectively located at an upstream side and a downstream side of the bending punches 71 in the plate feeding direction, are omitted for the purpose of simplicity.

The bending punches 71 are positioned at the upper side of the band plate 15 and movable in the vertical direction. Each of the bending punches 71 has a pressing portion 72 at its downward end in a direction to the band plate 15. The multiple bending punches 71 are arranged in the width direction. The bending punch 71 (71a) located at an intermediate position in the width direction (at a center position in the present embodiment) is arranged on a line corresponding to the flat-plate connecting portion 19 (namely, the corrugated-plate connecting portion 13).

The bending die 73 is located at the lower side of the band plate 15 and has multiple recessed portions 74, each of which corresponds to each pressing portion 72 of the bending punches 71.

The punch driving portion 75 includes an operating portion 76, which is composed of, for example, a hydraulic cylinder, an electrically-operated cylinder or the like. The punch driving portion 75 further has a cam portion 77, which is driven by the operating portion 76 to push down the respective bending punches 71. The punch driving portion 75 sequentially pushes down the bending punches 71 toward the band plate 15, in such an order from the intermediate bending punch 71a to the bending punches 71 arranged at both side ends of the band plate 15 in the width direction. During the above process for push-down of the bending punches 71, the flat-plate portion 21 corresponding to each of the pressing portions 72 is pressed into the respective recessed portions 74. The flat-plate portion 21 is then deformed along a concave-convex shape of the bending die 73, so as to shape the flat-plate portion 21 to the corrugated-plate portion 11, each having the multiple projections 12. The projections 12 are arranged in the width direction and each of the projections 12 extends in the plate feeding direction (in the longitudinal direction of the projection 12).

The punch driving portion 75 drives the bending punches 71 in the vertical direction (in the direction perpendicular to the band plate 15), each time when the plate feeding device 40 feeds the band plate 15 by the predetermined feeding amount, so that the flat-plate portion 21 is bent to form the corrugated-plate portion 11. A position of the intermediate projection 12a in the width direction (the center projection 12a in the present embodiment) comes into line with the position of the corrugated-plate connecting portion 13 in the width direction.

The control unit 80 is composed of an input portion having multiple push-buttons and a setting portion for presetting a connecting number of the corrugated-plate portions 11, based on electrical signals inputted from the input portion. The connecting number of the corrugated-plate portions 11 of the inner fin 10, which is preset by the control unit 80, is transmitted to the fifth processing unit 90 (the cutoff unit 90)

The cutoff unit 90 is located at a downstream side of the fourth processing unit 70 (for shaping the flat-plate portion 21 to the corrugated-plate portion 11) in the plate feeding direction. The cutoff unit 90 is composed of a cutoff punch 91, a cutoff die 93 and a punch driving portion 94.

The cutoff punch 91 is located at the upper side of the corrugated-plate connecting portions 13 of the band plate 15 and movable in the vertical direction. The cutoff punch 91 has a cutting blade portion 92 for cutting off the corrugated-plate connecting portions 13 of the band plate 15.

The cutoff die 93 is located at the lower side of the band plate 15 (the corrugated-plate portions 11) and has a die hole (not shown) at a position corresponding to the cutting blade portion 92 of the cutoff punch 91.

The punch driving portion 94 is composed of, for example, a hydraulic cylinder, an electrically-operated cylinder or the like.

The punch driving portion 94 counts a number of feeding operation of the plate feeding device 40, which feeds the band plate 15 by the predetermined feeding amount for each feeding operation.

The punch driving portion 94 drives the cutoff punch 91 in the vertical direction (in the direction perpendicular to the band plate 15), when a counted number for the feeding operation of the band plate 15 coincides with a predetermined number of the corrugated-plate portions 11 (which corresponds to the preset connecting number), so that the corrugated-plate connecting portion 13 is cut off. The corrugated-plate portions 11 cut off from the band plate 15 forms the inner fin 10, which is an aggregate of the multiple corrugated-plate portions 11.

A method for manufacturing the inner fin 10 by use of the corrugated-plate manufacturing apparatus 30 will be further explained with reference to FIGS. 5 to 8.

Figure 8:
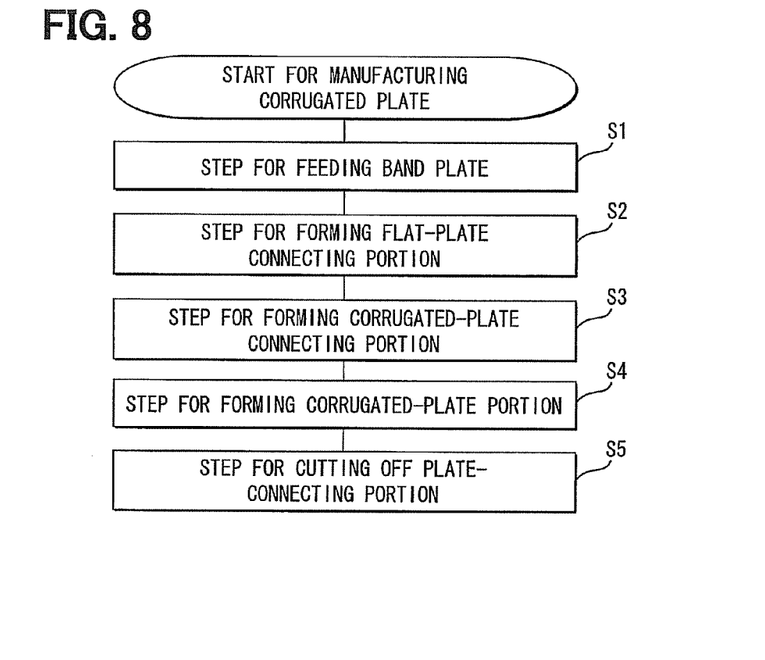
FIG. 8 is a process chart for manufacturing the inner fin by the corrugated-plate manufacturing apparatus.

As shown in FIG. 8, the manufacturing method for the inner fin 10 includes a first step S1 for a plate feeding process, a second step S2 for forming the flat-plate connecting portions, a third step S3 for forming the corrugated-plate connecting portions, a fourth step S4 for shaping the flat-plate portion 21 to the corrugated-plate portion, and a fifth step S5 for cutting off the corrugated-plate connecting portion.

In the first step S1, the rotational shaft 41 is rotated by the rotation driving portion 42. The band plate 15, which is wound in the coil shape and supported by the rotational shaft 41, is un-rolled by the rotation of the rotational shaft 41 so that the un-rolled band plate 15 is fed in the plate feeding direction (in the longitudinal direction of the band plate 15). The band plate 15 is intermittently supplied by the predetermined feeding amount.

In the second step S2, the blanking punch 51 is moved in the vertical direction by the punch driving portion 55, each time when the plate feeding device 40 feeds the band plate 15 by the predetermined feeding amount, in order to form three flat-plate connecting portions 18, 19 and 20 in the band plate 15 in the width direction. Those three flat-plate connecting portions 18, 19 and 20 are formed in the band plate 15 at the predetermined intervals in the plate feeding direction.

In the step S3, the cutoff punch 61 is moved in the vertical direction in order to cut off the flat-plate connecting portions 18 and 20, each time when the plate feeding device 40 feeds the band plate 15 by the predetermined feeding amount. The intermediate flat-plate connecting portion 19 between the other two flat-plate connecting portions 18 and 20 is kept as the corrugated-plate connecting portion 13. Multiple corrugated-plate connecting portions 13 are formed in the band plate 15 at the predetermined intervals in the plate feeding direction.

In the step S3, the flat-plate connecting portion 19 (the corrugated-plate connecting portion 13) is fitted into the groove 64 of the cutoff punch 61, when the cutoff punch 61 is moved in the downward direction, so that the band plate 15 is positioned to the bending punches 71 in the width direction.

In addition, when the cutoff punch 61 is moved in the downward direction, the forward- surface 65 of the cutoff punch 61 is brought into contact with the back-side end of the flat-plate portion 21 at the downstream position, and the backward-side surface 66 of the cutoff punch 61 is brought into contact with the front-side end of the flat-plate portion 21 at the upstream position. As a result, the band plate 15 is positioned to the bending punches 71 in the plate feeding direction.

In the step S4, the cam portion 77 is pushed to the bending punches 71 by the operating portion 76 of the punch driving portion 75. The bending punches 71 are sequentially pushed down to the flat-plate portion 21 of the band plate 15 in the order from the intermediate bending punch 71 (71a) to the bending punches 71 at the outer most sides of the flat-plate portion 21 in the width direction. The intermediate bending punch 71a corresponds to the position for the corrugated-plate connecting portion 13 in the width direction. The flat-plate portion 21 of the band plate 15 is sequentially pressed and bent from the intermediate portion to the side end portions of the band plate 15 in the width direction, so that the corrugated-plate portion 11 is formed. The corrugated plate portion 11 has the multiple projections 12 arranged in the width direction and each of the projections 12 extends in the plate feeding direction.

In the step S5, the cutoff punch 91 is moved by the punch driving portion 94 in the downward direction in order to cut off the corrugated-plate connecting portion 13, so that the aggregate of a predetermined number of the corrugated-plate portions 11 (that is, the inner fin 10) is formed. The number of the corrugated-plate portions 11 included in one aggregate corresponds to the connecting number preset by the control unit 80.

As above the inner fin 10 is formed, wherein the multiple corrugated-plate portions 11 are connected to each other by each of the corrugated-plate connecting portions 13.

As explained above, according to the corrugated-plate manufacturing apparatus 30 and the method for manufacturing the same, the third processing unit 60 forms the corrugated-plate connecting portion 13 at the intermediate position (e.g. at the center position) in the width direction of the band plate 15, wherein the multiple corrugated-plate connecting portions 13 are formed at the predetermined intervals in the plate feeding direction. The fourth processing unit 70 bends the flat-plate portion 21 of the band plate 15 in order to form the corrugated-plate portion 11 having the multiple projections 12 arranged in the width direction of the band plate 15, wherein each of the projections 12 extends in the plate feeding direction. The fifth processing unit 90 cuts off the corrugated-plate connecting portion 13 corresponding to the predetermined connecting number preset by the control unit 80, to thereby form the aggregate of the corrugated-plate portions 11 (that is, the inner fin 10)

It is, therefore, possible to manufacture the multiple different kinds of the inner fins 10 by simply changing the connecting number for the corrugated-plate portions 11 without exchanging the coil for the band plate 15, wherein each different kind of the inner fin 10 has a different length in the longitudinal direction of the aggregate of the corrugated-plate portions 11 (that is, the plate feeding direction and the longitudinal direction of the projections 12). In other words, it is not necessary to stop the manufacturing line for exchanging the coil of the band plate 15 for the purpose of changing the length of the inner fin 10 (the aggregate of the corrugated-plate portions 11). Accordingly, manufacturing efficiency can be increased.

In each of the flat-plate portions 21, which are connected to each other by the flat-plate connecting portion 19 in the plate feeding direction, the movement of the flat-plate portion 21 in the width direction (more exactly, every area of the flat-plate portion 21) is not restricted except for the one portion in the width direction (that is, the portion corresponding to the flat-plate connecting portion 19). It is, therefore, possible to shape the flat-plate portion 21 into the corrugated-plate portion 11 by one operation of the fourth processing unit 70. In other words, it is sufficient to provide one processing unit 70 for shaping the flat-plate portion 21 to the corrugated-plate portion 11 in the plate feeding direction. A length of the manufacturing line can be minimized.

In addition, the third processing unit 60 forms the corrugated-plate connecting portion 13 at the intermediate position (e.g. at the center position) of the band plate 15 in the width direction. It is thereby possible to reduce the processing time at the fourth processing unit 70, at which the flat-plate portion 21 is sequentially bent into the corrugated form from the intermediate portion toward the both side ends of the band plate 15 in the width direction.

In addition, the fourth processing unit 70 shapes the flat-plate portion 21 to the corrugated-plate portion 11 in the following manner. In each of the corrugated-plate portions 11, the position of the corrugated-plate connecting portion 13 in the width direction coincides with the position of the top portion of the intermediate projection 12a (which is located at the center position in the width direction among the multiple projections 12) in the width direction. In the process of bending the flat-plate portion 21 of the band plate 15 into the corrugated form, the flat-plate portion 21 is not placed under restraint except for the intermediate portion of the flat-plate portion 21 in the width direction. It is, thereby, possible to avoid a situation that tensility is applied to the flat-plate portion 21. It is possible to prevent the flat-plate portion 21 from being broken down.

In addition, the fourth processing unit 70 has the multiple bending punches 71, the bending die 73 and the punch driving portion 75. The multiple bending punches 71 are arranged in the width direction. The punch driving portion 75 sequentially pushes down the respective bending punches 71 in such a manner that the bending punches 71 are sequentially pushed down to the flat-plate portion 21 from the intermediate bending punch 71a (corresponding to the position of the corrugated-plate connecting portion 13) to the bending punches 71 arranged at both side ends in the width direction. According to such sequential movements of the multiple bending punches 71, the flat-plate portion 21 is sequentially bent and the projections 12 are formed one by one. Therefore, it is possible to avoid the situation that tensility is applied to the flat-plate portion 21 in the width direction.

Furthermore, in the present embodiment, the second processing unit 50 is provided between the first processing unit 40 for feeding the band plate 15 and the third processing unit 60 for forming the corrugated-plate connecting portion 13, in order to form the multiple flat-plate connecting portions 18, 19 and 20 in the width direction of the band plate 15, the flat-plate connecting portions 18, 19 and 20 are formed at the predetermined intervals of the band plate 15 in the plate feeding direction. The band plate 15 is stably supplied in the apparatus 30 because of the multiple flat-plate connecting portions 18, 19 and 20.

In the present embodiment, the third processing unit 60 has the cutoff punch 61 and the punch driving portion 68, wherein the cutoff punch 61 has the groove 64 at the position corresponding to the corrugated-plate connecting portion 13 in the width direction.

The third processing unit 60 positions the band plate 15 to the bending punches 71, when the corrugated-plate connecting portion 13 is engaged with (fitted into) the groove 64 of the cutoff punch 61. It is, therefore, possible to exactly bend the flat-plate portion 21 by the bending punches 71.

(Second Embodiment)

Figure 9:
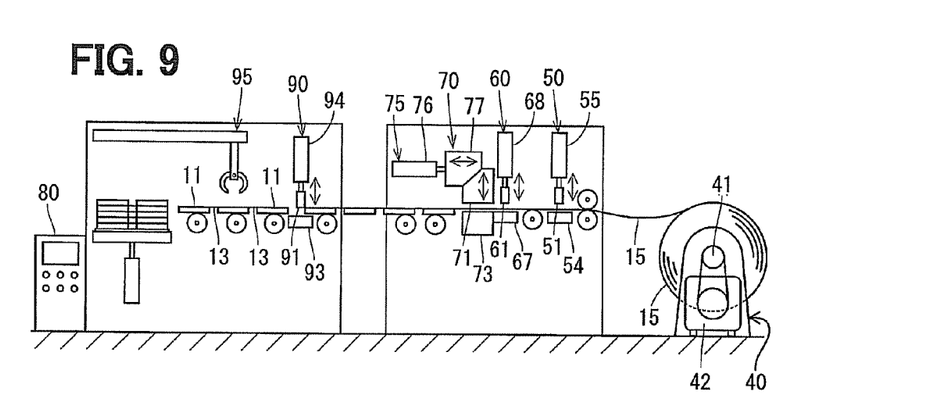
FIG. 9 is a schematic view showing a corrugated-plate manufacturing apparatus according to a second embodiment of the present disclosure.

A corrugated-plate manufacturing apparatus according to a second embodiment will be explained with reference to FIG. 9. According to the second embodiment, a sixth processing unit 95, which is composed of an assembling process, is provided at a downstream side of the fifth processing unit 90 (the cut-off unit 90) in the plate feeding direction. The sixth processing unit 95 assembles the inner fin 10 cut-off by the cut-off unit 90 into the tube 14.

The second embodiment has the same advantages to those of the first embodiment. In addition, it has an advantage that it is not necessary to store a stock for the inner fins 10 for manufacturing the tube 14 having the inner fin 10.

(Third Embodiment)

Figure 10:
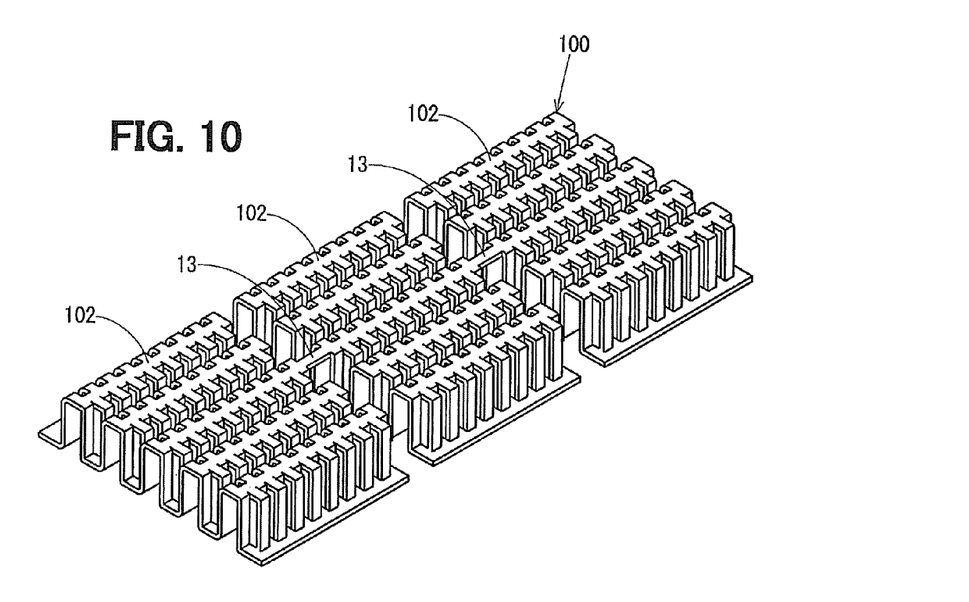
FIG. 10 is a schematic perspective view showing an offset type inner fin, which is manufactured by a corrugated-plate manufacturing apparatus according to a third embodiment of the present disclosure.

An offset fin 100, which is manufactured by a corrugated-plate manufacturing apparatus according to a third embodiment, is shown in FIG. 10. The offset fin 100, which is also a kind of the corrugated plates, is accommodated in the inside of the tube for the oil-cooler of the engine as in the same manner to the inner fin 10.

Figure 11:
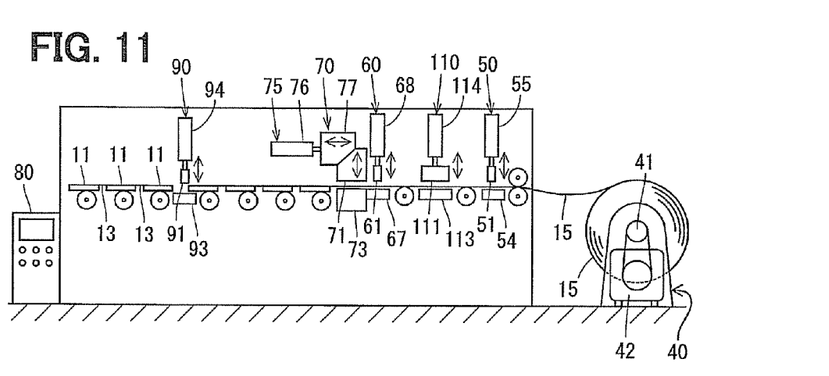
FIG. 11 is a schematic view showing the corrugated-plate manufacturing apparatus according to the third embodiment of the present disclosure.
Figure 12:
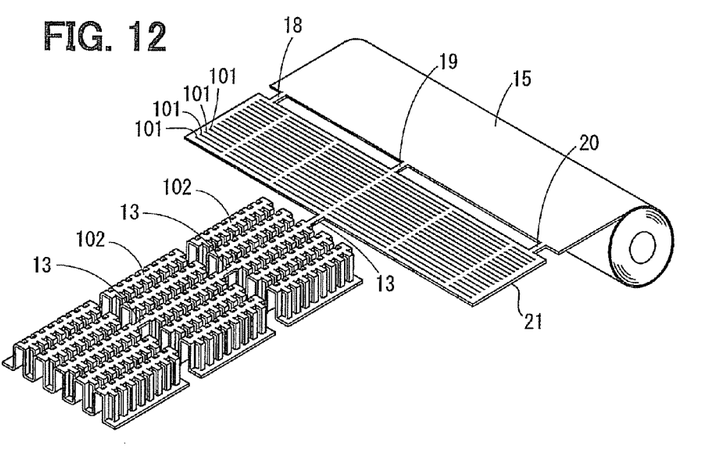
FIG. 12 is a schematic perspective view showing a band plate, which is processed by the corrugated-plate manufacturing apparatus of FIG. 11.

The corrugated-plate manufacturing apparatus according to the third embodiment will be explained with reference to FIGS. 11 and 12. According to the third embodiment, a processing unit 110 (hereinafter, a slit forming unit 110) is provided between the second processing unit 50 (for forming the flat-plate connecting portions 18, 19, 20) and the third processing unit 60 (for forming the corrugated-plate connecting portion 13). The slit forming unit 110 has a blanking punch ill, a blanking die 113 and a punch driving portion 114.

The blanking punch 111 is positioned at the upper side of the band plate 15 and movable in the vertical direction. The blanking punch 111 has multiple slit forming portions (not shown), which are arranged in the plate feeding direction as well as in the width direction. The slit forming portions form multiple slits 101 in the band plate 15, wherein the multiple slits 101 are arranged in the plate feeding direction and the width direction.

The blanking die 113 is positioned at the lower side of the band plate 15 and has multiple die holes (not shown), respectively corresponding to the slit forming portions of the blanking punch 111.

The punch driving portion 114 is composed of, for example, a hydraulic cylinder, an electrically-operated cylinder or the like. The punch driving portion 114 drives the blanking punch 111 in the vertical direction (in the direction perpendicular to the band plate 15), each time when the plate feeding device 40 feeds the band plate 15 by the predetermined feeding amount, so that the multiple slits 101 are formed in the band plate 15.

The fourth processing unit 70 bends the flat-plate portion 21, in which the multiple slits 101 are formed, so as to form a corrugated-plate portion 102, which corresponds to the offset fin 100.

In the third processing unit 60 (for forming the corrugated-plate connecting portion 13), the band plate 15 is positioned to the bending punches 71 of the fourth processing unit 70, when the corrugated-plate connecting portion 13 (corresponding to the intermediate flat-plate connecting portion 19) is engaged with the cutoff punch 61 of the third processing unit 60. It is, therefore, possible to exactly bend the flat-plate portion 21 by the bending punches 71 to form the offset fin 100.

(Further Embodiments and/or Modifications)

In one of modifications, the first processing unit 40 may be composed of two portions, one of which is un-rolling the band plate 15 from the coil and the other of which is feeding the un-rolled band plate 15 to the second processing unit 50. For example, the portion for feeding the un-rolled band plate 15 may be composed of a conveyer or the like. In addition, the portion for un-rolling the band plate should not be limited to the rotational shaft, which is arranged at an inside of the coil-shaped band plate. A pressure roll, a pressure belt or the like, which is pushed to an outside of the coil-shaped band plate, may be also used for un-rolling the band plate.

In another modification, the second processing unit 50 for forming the flat-plate connecting portions may be removed from the apparatus 30.

In a further modification, the flat-plate connecting portions may be formed by the second processing unit 50 at two or four positions (or more than four positions) of the band plate in the width direction.

In a still further modification, the corrugated-plate connecting portion may be formed not at the center position but at another position of the band plate in the width direction.

In a still further modification, the corrugated-plate connecting portion may be formed at such a position that the corrugated-plate connecting portion does not coincide with the position for the top point of the projection. In other words, the corrugated-plate portion may be formed in which the corrugated-plate connecting portion is formed at the position other than the top point of the projection.

In a still further modification, multiple flat-plate portions may be bent at the same time by the fourth processing unit 70 by one operation thereof (one cycle for forming the corrugated-plate portions).

In a still further modification, the multiple neighboring bending punches may be pushed down at the same time to the flat-plate portion.

In a still further modification, the bending punches 71 of the fourth processing unit 70 may be composed of one bending punch having multiple pressing portions at its lower end, wherein each of the pressing portions extends in the plate feeding direction and the multiple pressing portions are arranged in the width direction.

In a still further modification, the fourth processing unit 70 for foaming the corrugated-plate portion may have bending punches at the both sides (the upper and the lower sides) of the band plate in the vertical direction, so that the band plate is bent from the both sides.

In a still further modification, the third processing unit 60 for forming the corrugated-plate connecting portion 13 may not always necessarily have the function for positioning the band plate 15 to the bending punches 71.

The corrugated-plate portion 11, which is manufactured by the manufacturing machine 30 and the manufacturing method of the present disclosure, may be used not only as the inner fin 10 for the oil-cooler but also as fins for any kinds of heat exchangers. For example, the corrugated-plate portion is used for the heat exchanger for cooling operation but also for the heat exchanger for heating operation. The corrugated-plate portion may be applied to not only the heat exchanger using the oil as its medium but also the heat exchanger using the water, the air or the like as its medium. In a case that the corrugated-plate portion is applied to the heat exchanger for radiating heat, the corrugated-plate portion may be used for not only a heat-radiating device of a direct heat-radiation type but also a heat-radiating device of an indirect heat-radiation type.

In addition, in a case that the corrugated-plate portion is used as the inner fin, it is not always necessary to arrange the corrugated-plate portions in the tube in a laminated structure. In other words, the corrugated-plate portions may be formed in the tube in the laminated structure (that is, a multiple-layer structure) in a direction perpendicular to a flow direction of fluid, or the corrugated-plate portion (or portions) may be formed in the tube in a one-layer structure.

Furthermore, the corrugated-plate portion may be used not only as a heat absorbing element but also as a heat radiating element. For example, the corrugated-plate portions maybe used as an outer fin for a radiator or the like.

A cross-sectional shape of the projection 12 of the corrugated-plate portion 11 may be formed in a wave shape only having curved lines, a rectangular shape or a trapezoidal shape only having straight lines, a dancette shape having curved lines and straight lines, a rectangular or a trapezoidal shape having the curved lines and the straight lines, an so on.

In a case that the corrugated-plate portion is used as the offset fin, a number of steps may not be limited to two but the number of the steps may be more than two. A width of an offset portion may not be limited to a half of the width of the projection.

The present disclosure should not be limited to the above embodiments and/or modifications but may be modified in various manners without departing from the spirits of the present disclosure.

What is claimed is:

1. A manufacturing apparatus for a corrugated plate comprising:
 a plate feeding unit for un-rolling a band plate from a coil and feeding an un-rolled band plate in a longitudinal direction of the band plate;
 a first connecting-portion forming unit for forming a plate connecting portion at one position of the band plate in a width direction of the band plate, wherein multiple plate connecting portions are formed in the band plate at predetermined intervals in a plate feeding direction of the band plate, so that multiple flat-plate portions are formed in the plate feeding direction and respectively connected to each other by each of the plate connecting portions;
 a corrugation forming unit having bending punches for bending each of the flat-plate portions between the neighboring plate connecting portions to form a corrugated-plate portion in such a way that the flat-plate portion is corrugated in the width direction of the band plate so as to reduce a width of the flat-plate portion in the width direction, wherein the corrugated-plate portion has multiple projections arranged in the width direction of the band plate and each of the projections extends in the plate feeding direction;
 a control unit for presetting a connecting number for the corrugated-plate portions to be included in a corrugated fin; and
 a cutoff unit for cutting off the plate connecting portion corresponding to a predetermined connecting number preset by the control unit, so as to form the corrugated fin, which is composed of one corrugated-plate portion or which is composed of the multiple corrugated-plate portions and one or multiple plate connecting portions;
 wherein
 the corrugation forming unit is composed of;
 multiple bending punches arranged in the width direction, each of the bending punches extending in the plate feeding direction; and
 a driving portion for sequentially pushing down the respective bending punches to the flat-plate portion in such an order from an intermediate bending punch to the bending punches at both side ends in the width direction, wherein the intermediate bending punch is formed at the position corresponding to the plate connecting portion; and
 the first connecting-portion forming unit is composed of;
 a cutoff punch having a groove at such a position corresponding to the plate connecting portion in the width direction, so that the flat-plate connecting portion is inserted into the groove when the cutoff punch is pushed down; and
 a driving portion for driving the cutoff punch so that the cutoff punch is pushed down,
 wherein the flat-plate portion of the band plate is positioned to the bending punches when the plate connecting portion is inserted into and engaged with the groove of the cutoff punch, so that the flat-plate portion is corrugated by the bending punches while the flat-plate portion is positioned to the bending portions.

2. The manufacturing apparatus according to claim 1, wherein
 the first connecting-portion forming unit forms the plate connecting portion at a center position of the band plate in the width direction thereof.

3. The manufacturing apparatus according to claim 1, wherein
 the corrugation forming unit forms the corrugated-plate portion in such a manner that a position of a top point for one of the projections in the width direction coincides with a position of the plate connecting portion in the width direction.

4. The manufacturing apparatus according to claim 1, further comprising:
 a second connecting-portion forming unit provided between the plate feeding unit and the first connecting-portion forming unit for forming multiple flat-plate connecting portions in each of the flat-plate portions of the band plate in the width direction of the band plate,
 wherein the first connecting-portion forming unit cuts off the multiple flat-plate connecting portions except for one flat-plate connecting portion, so that such one flat-plate connecting portion remains in the band plate as the plate connecting portion.

5. The manufacturing apparatus according to claim 1, further comprising:
 a slit forming unit provided between the plate feeding unit and the corrugation forming unit for forming multiple slits in the flat-plate portion,
 wherein the corrugation forming unit forms an offset type corrugated-plate portion.

6. The manufacturing apparatus according to claim 1, wherein the multiple projections include upper-side projections and lower-side projections, the lower-side projections being spaced from the upper-side projections in a direction perpendicular to the longitudinal direction of the band plate and perpendicular to the width direction.

7. The manufacturing apparatus according to claim 1, wherein the multiple projections form a wavy surface extending in the width direction of the band plate.

8. A manufacturing apparatus for a corrugated plate for a heat exchanger comprising:
- a plate feeding unit for un-rolling a band plate from a coil and feeding an un-rolled band plate in a longitudinal direction of the band plate;
- a connecting-portion forming unit for forming multiple flat-plate connecting portions in the band plate at predetermined intervals in a plate feeding direction of the band plate so as to form multiple flat-plate portions arranged in the plate feeding direction, wherein respective neighboring flat-plate portions are connected to each other in the plate feeding direction by one flat-plate connecting portion;
- a corrugation forming unit having bending punches for bending each of the flat-plate portions between the neighboring flat-plate connecting portions to form a corrugated-plate portion, wherein the corrugated-plate portion has multiple projections arranged in a width direction of the band plate and each of the projections extends in the plate feeding direction;
- a control unit for presetting a connecting number for the corrugated-plate portions to be included in each of corrugated fins assembled in the heat exchanger; and
- a cutoff unit for cutting off the plate connecting portion corresponding to a predetermined connecting number preset by the control unit, so as to form the corrugated fin, which is composed of one corrugated-plate portion or which is composed of the multiple corrugated-plate portions and one or multiple plate connecting portions, wherein the connecting-portion forming unit is composed of;
- a cutoff punch having a groove at such a position corresponding to the plate connecting portion in the width direction, so that the flat-plate connecting portion is inserted into the groove when the cutoff punch is pushed down; and
- a driving portion for driving the cutoff punch so that the cutoff punch is pushed down,
- wherein the flat-plate portion of the band plate is positioned to the bending punches when the flat-plate connecting portion is inserted into and engaged with the groove of the cutoff punch, so that the flat-plate portion is corrugated by the bending punches while the flat-plate portion is positioned to the bending punches.

9. The manufacturing apparatus according to claim 8, wherein the multiple projections include upper-side projections and lower-side projections, the lower-side projections being spaced from the upper-side projections in a direction perpendicular to the longitudinal direction of the band plate and perpendicular to the width direction.

10. The manufacturing apparatus according to claim 8, wherein the multiple projections form a wavy surface extending in the width direction of the band plate.

* * * * *